(12) United States Patent
Rachwal

(10) Patent No.: US 6,239,555 B1
(45) Date of Patent: May 29, 2001

(54) FLASHLIGHT

(76) Inventor: Erwin J. Rachwal, 4975 Southern Wood Dr., Sarasota, FL (US) 34241

( * ) Notice: Subject to any disclaimer, the term of this patent is extended or adjusted under 35 U.S.C. 154(b) by 0 days.

(21) Appl. No.: 09/658,142

(22) Filed: Sep. 8, 2000

Related U.S. Application Data

(62) Division of application No. 09/286,520, filed on Apr. 6, 1999, now Pat. No. 6,140,776.

(51) Int. Cl.[7] .................................................. H05B 37/00
(52) U.S. Cl. ...................... 315/200 R; 362/205; 362/208
(58) Field of Search .............................. 315/200 R, 291; 362/84, 192, 208, 802, 800, 202, 205

(56) References Cited

U.S. PATENT DOCUMENTS

| | | | |
|---|---|---|---|
| 2,092,845 | 9/1937 | Holmes | 240/10.5 |
| 2,105,719 | 1/1938 | Collins | 171/76 |
| 2,261,073 | 10/1941 | Painter | 67/29 |
| 3,099,402 | 7/1963 | Speck | 240/10.66 |
| 4,144,557 | 3/1979 | Kerr, III et al. | 362/84 |
| 4,228,484 | 10/1980 | Johnstone | 362/184 |
| 4,290,095 | 9/1981 | Schmidt | 362/191 |
| 4,315,301 | 2/1982 | Jimena | 362/193 |
| 4,546,416 | 10/1985 | Pemberton | 362/84 |
| 4,701,835 | 10/1987 | Campagnuolo et al. | 362/192 |
| 4,774,644 | 9/1988 | Ohashi | 362/202 |
| 4,866,580 | 9/1989 | Blackerby | 362/800 |
| 5,138,538 | 8/1992 | Sperling | 362/802 |
| 5,552,973 | 9/1996 | Hsu | 362/192 |
| 5,584,561 | 12/1996 | Lahos | 362/72 |
| 5,633,623 | 5/1997 | Campman | 340/321 |
| 5,685,632 | 11/1997 | Schaller et al. | 362/205 |
| 5,839,821 | 11/1998 | LeZotte | 362/208 |
| 5,909,952 | 6/1999 | Guthrie et al. | 362/202 |
| 5,931,562 | 8/1999 | Arato | 362/205 |
| 5,975,714 | 11/1999 | Vetorino et al. | 362/205 |

OTHER PUBLICATIONS

Article entitled "Solar Lanterns and Flashlights" by Jade Mountain, Inc., copyright 1998.
Article entitled "Twelve Volt DC Red and Yellow High Intensity LED Lights for Boat, Plane, Cabin, RV", publication date unknown but prior to Mar. 16, 1998.
Article entitled "LED Flashlight", disclosed by R. F. Mckeever in Research Disclosure, Mar. 1980, pp. 105 and 106.

*Primary Examiner*—Don Wong
*Assistant Examiner*—Thuy Vinh Tran
(74) *Attorney, Agent, or Firm*—Tarolli, Sundheim, Covell, Tummino & Szabo L.L.P.

(57) ABSTRACT

A flashlight includes a source of power, a source of light, and switching circuitry connected with the source of power and the source of light. The source of light is a semiconductor diode capable of emitting white light when energized. The source of power may be a battery or a generator. The switching circuitry is operable between an on condition and an off condition. When the switching circuitry is in the off condition, it is effective to energize the semiconductor diode to provide light of a low intensity to facilitate locating the flashlight. When the switching circuitry is in the on condition, it is effective to energize the semiconductor diode to emit white light of an intensity sufficient to illuminate objects spaced more than six feet from the flashlight. The switching circuitry includes a transistor which is operated between conducting and non-conducting conditions by a flip/flop in response to manual actuation of a pushbutton.

2 Claims, 2 Drawing Sheets

US 6,239,555 B1

FLASHLIGHT

RELATED APPLICATION

This application is a divisional of application Ser. No. 09/286,520, filed Apr. 6, 1999, now U.S. Pat. No. 6,140,776. The benefit of the earlier filing date of the aforementioned application Ser. No. 09/286,520 is hereby claimed.

BACKGROUND OF THE INVENTION

The present invention relates to a new and improved flashlight and more specifically to a flashlight which uses a semiconductor diode as a source of light.

It has been suggested that a flashlight may use either a red or green light emitting diode in place of a conventional bulb. When a mechanical switch is actuated, the light emitting diode is energized by a battery in the flashlight. A flashlight having this construction is disclosed in U.S. Pat. No. 4,290,095.

It has previously been suggested that a flashlight could have springs which drive a generator to provide power. The output from the generator is used to energize a conventional light bulb. A flashlight having this construction is disclosed in U.S. Pat. No. 3,099,402.

A flashlight having a light emitting diode which periodically flashes to aid in finding the flashlight in the dark is disclosed in U.S. Pat. No. 4,228,484. The flashlight disclosed in this patent has a battery which energizes a conventional light bulb when a mechanical switch is actuated. The light emitting diode continuously flashes when a battery is disposed in the flashlight.

SUMMARY OF THE INVENTION

The present invention provides a new and improved flashlight, that is, a battery-operated portable electric light, having a semiconductor diode which is capable of emitting light when energized. Electrical circuitry interconnects the diode and a source of power which may be either a battery or a generator.

The electrical circuitry includes a switch which is operable between a first condition and a second condition. When the switch is in the first condition, the diode is energized to provide light of a low intensity to facilitate locating the flashlight. When the switch is in the second condition, the diode is energized to provide light of a high intensity which may be sufficient to illuminate objects spaced more than six feet from the flashlight. The diode may emit white light when energized.

The electrical circuitry may include a manually movable member. Upon actuation of the manually movable member, a transistor or other semiconductor device is switched between conducting and nonconducting states. The light emitting diode is changed between a condition in which it is energized to emit high intensity white light and low intensity white light in response to actuation of the transistor between the conducting and nonconducting states.

A regulator is advantageously connected with the diode and the source of power to maintain the intensity of the white light emitted from the diode substantially constant. When the diode is energized to provide high intensity white light, the regulator is effective to maintain the intensity of the white light constant even though the strength of the source of power connected with the diode decreases. This enables white light of a uniform intensity to be obtained from the light emitting diode even though a power source which gradually discharges with the passage of time is used to energize the light emitting diode.

BRIEF DESCRIPTION OF THE DRAWINGS

The foregoing and other features of the invention will become more apparent upon a consideration of the following description taken in connection with the accompanying drawings wherein.

DESCRIPTION OF SPECIFIC PREFERRED EMBODIMENTS OF THE INVENTION

General Description

Figure 1:
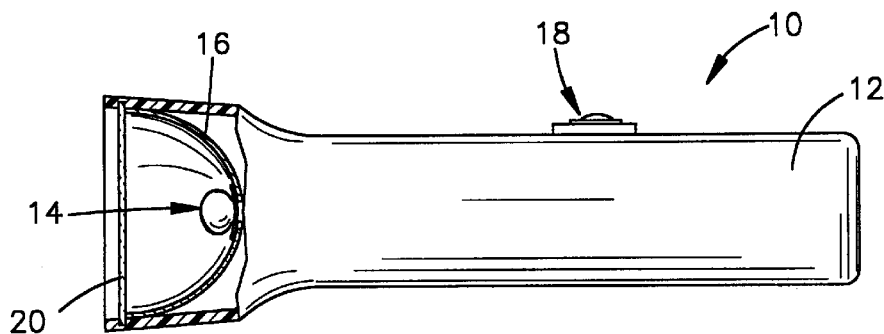
FIG. 1 is a schematic illustration of one embodiment of a flashlight constructed in accordance with the present invention.

A flashlight 10 constructed in accordance with the present invention is illustrated in FIG. 1. The flashlight 10 includes a cylindrical housing 12 which encloses suitable batteries (not shown). A light emitting diode 14 is mounted in a reflector 16 and is electrically connected with the batteries in the housing by a switch assembly 18. A lens 20 closes one end, that is the left end as viewed in FIG. 1, of the flashlight 10.

Although a flashlight 10 having a cylindrical housing 12 which is gripped manually has been illustrated in FIG. 1, it should be understood that the flashlight could have a different construction. Thus, the flashlight 10 could have a housing 12 with a construction which facilitates positioning the flashlight on a support surface with the light emitting diode 14 and lens 20 facing upward so that the flashlight may function as a lamp. Alternatively, the flashlight 10 could have a housing with a construction corresponding to the construction of a toy so that the light emitting diode 14 is energized to provide light from the toy. Regardless of the configuration which is selected for the housing 12, the flashlight 10 will have a relatively long operating life since the light emitting diode 14, which is utilized as a source of light, requires relatively little power when energized.

In accordance with a feature of the present invention, the light emitting diode 14 is energizeable to emit white light. The white light emitting diode 14 may contain gallium nitrate. Regardless of the composition of the light emitting diode 14, it is effective to emit white light of an intensity which will vary as a function of the magnitude of an electrical current conducted through the light emitting diode 14.

When a very small amount of current is being conducted through the light emitting diode 14, it is effective to provide white light of a low intensity. The low intensity light is insufficient to illuminate objects spaced three feet or more from the flashlight 10. When a larger current is conducted through the light emitting diode 14, it is effective to emit white light of a relatively high intensity which is capable of illuminating objects at a distance of more than six feet from the flashlight 10.

Figure 2:
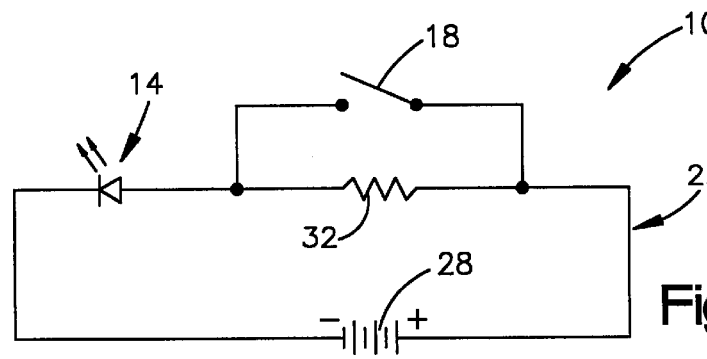
FIG. 2 is a highly schematicized illustration of one embodiment of electrical circuitry which may be used with a light emitting diode in the flashlight of FIG. 1.

Switching circuitry 26 is illustrated in FIG. 2 in association with the light emitting diode 14 and a suitable battery 28. The switching circuitry 26 includes a resistor 32 which is connected in parallel with the switch assembly 18.

When the switch assembly 18 is in an open or off condition illustrated in FIG. 2, the light emitting diode 14 is energized to provide white light of a very low intensity. The white light of a low intensity emitted from the light emitting diode 14 when the switch assembly 18 is in the off condition, facilitates locating the flashlight 10. Thus, when the switch assembly 18 is in the off or nonconducting condition, the light emitting diode 14 is continuously energized by a relatively small flow of current conducted from the battery 28 through the resistor 32. This small flow of current is effective to energize the light emitting diode to emit white light of very low intensity. Even though the white light emitted by the light emitting diode 14 has a low intensity, it enables the flashlight 10 to be easily located in the dark, for example, in a drawer in an unlighted room.

When the flashlight 10 is to be utilized to illuminate an object, the switch assembly 18 is operated from the open condition illustrated in FIG. 2 to a closed condition. When the switch assembly 18 is closed, electrical current is conducted from the battery 28 through the switch assembly to the light emitting diode 14 at a rate sufficient to energize the light emitting diode to continuously emit white light of a high intensity. The white light of the high intensity emitted by the light emitting diode 14 is sufficient to illuminate objects at a distance of more than six feet from the flashlight 10.

When the switch assembly 18 (FIG. 2) is in the closed or on condition, the light emitting diode 14 draws current from the battery 28 at a rate which is substantially less than the rate which current would be drawn from the battery by a conventional incandescent light bulb. Therefore, the flashlight 10 can be operated for a relatively long time without discharging the battery 28. When the switch assembly 18 is in the open condition and the light emitting diode 14 is energized to provide low intensity light, the electrical current conducted from the battery 28 is extremely small. This enables the flashlight 10 to remain in the off condition in which the light emitting diode 14 continuously emits low intensity light, for very long periods of time without significantly discharging the battery 28.

In one specific embodiment of the flashlight 10, the battery 28 was a nine volt battery. In this specific embodiment of the invention, the light emitting diode 14 was energized by a current of approximately thirty microamperes when the switch assembly 18 was in the off or open condition. At this time, the light emitting diode 14 was effective to continuously emit white light of a low intensity.

When the switch assembly 18 was operated to the closed condition, the light emitting diode 14 was effective to emit white light of relatively high intensity. At that time, a current flow of eighty milliamperes was utilized to energize the light emitting diode 14. It should be understood that the foregoing specific current levels have been set forth herein for purposes of clarity of description. It is contemplated that the flashlight 10 could be constructed so as to have current flow levels which are different than these specific current flow levels.

The relatively low current required to energize the flashlight 10 enables the same battery 28 to be used over a very long period of time without replacing the battery. The same light emitting diode 14 is used to emit light of low intensity to facilitate locating the flashlight 10 when the flashlight is turned off and to emit light of high intensity, when the flashlight is turned on. Therefore, the construction of the flashlight is simplified and the number of components reduced.

In the embodiment of the invention illustrated in FIGS. 1 and 2, the diode 14 is continuously energized to emit light of a low intensity when the switch 18 is in an off or open condition. However, if desired, the switching circuitry 26 could be constructed so as to interrupt all flow of current to the light emitting diode 14 when the switch 18 is in the off condition. If this is done, it may be desired to utilize a three position switch 18 having a first or off position in which the light emitting diode 14 is de-energized, a second actuated position in which the light emitting diode is energized to emit white light of a low intensity and a third actuated position in which the light emitting diode is energized to emit white light of a high intensity.

Switching Circuitry

Figure 3:
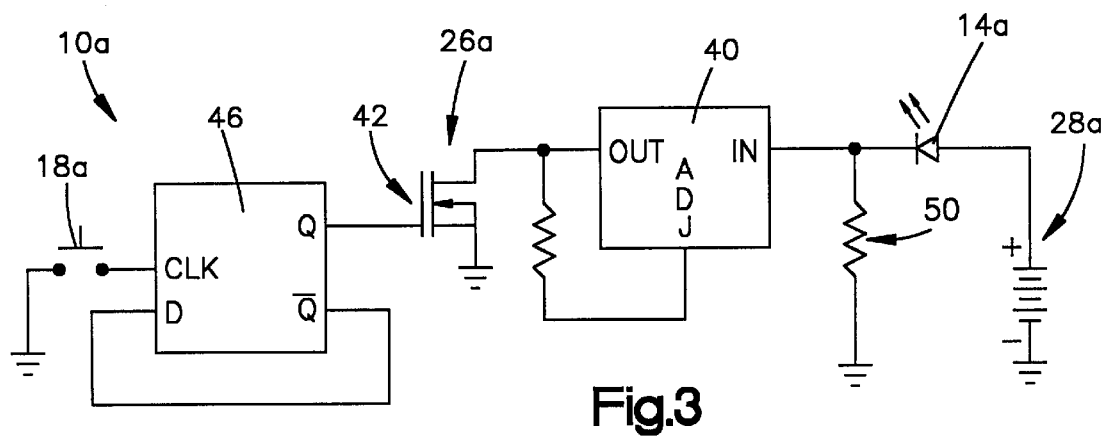
FIG. 3 is a schematic illustration of another embodiment of electrical circuitry which may be used with a light emitting diode in the flashlight of FIG. 1.

In the embodiment of the invention illustrated in FIGS. 1 and 2, a simple mechanical switch assembly 18 is utilized to control the flow of electrical current between the battery and the light emitting diode. In the embodiment of the invention illustrated in FIG. 3, solid state switching circuitry is utilized to minimize the current required to control operation of the light emitting diode. Since the embodiment of the invention illustrated in FIG. 3 is generally similar to the embodiment of the invention illustrated in FIGS. 1 and 2, similar numerals will be utilized to identify similar components, the suffix letter "a" being associated with the numerals of FIG. 3 to avoid confusion.

A flashlight 10*a* has switching circuitry 26*a* which controls the flow of current from a battery 28*a* through a semiconductor diode 14*a* which is capable of emitting white light when energized. The intensity of the white light emitted by the diode 14*a* varies as a function of the magnitude of the current conducted through the diode.

The switching circuitry 26*a* includes a manually actuatable momentary pushbutton switch 18*a*. In addition to the pushbutton switch 18*a*, the switching circuitry 26*a* includes an adjustable voltage regulator 40 which is connected with a semiconductor switching device 42. In the illustrated embodiment of the invention, the voltage regulator 40 is connected with the drain of a metal-oxide-silicon-field-effect transistor (MOSFET) 42. Of course, other known types of semiconductor switching devices could be used in place of the MOSFET 42 if desired. The adjustable voltage regulator 40 is configured as a current regulator with feedback through resistor 50 to provide a desired rate of current flow through when the light emitting diode 14*a* is energized to emit white light of a high intensity.

An output of a flip/flop 46 is connected with the gate of the transistor 42. The flip/flop 46 is stable in either one of two conditions. The flip/flop 46 is stable in an on condition in which there is a high output signal from the flip/flop to the gate of the transistor 42 to render the transistor conducting. The flip/flop 46 is also stable in an off condition in which there is a low output signal from the flip/flop to the transistor 42 and the transistor is nonconducting.

When the flip/flop is in a condition in which there is a low output signal to the transistor 42, the light emitting diode 14*a* is energized by a relatively small flow of current from the battery 28*a* through the resistor 50 to ground. At this time, the light emitting diode 14*a* continuously emits white light of a low intensity. The low intensity white light from the light emitting diode 14*a* enables the flashlight 10*a* to be readily located.

When the flashlight is to be utilized to illuminate an object, the pushbutton 18a is manually depressed and then released. This results in an instantaneous closing of the contacts in the pushbutton switch assembly 18a. Closing the contacts in the pushbutton switch assembly 18a toggles the flop/flop 46a from the off condition in which it produces a low output signal, to the on condition in which it produces a high signal to the gate of the transistor 42. The output signal from the flip/flop 46 to the gate of the transistor 42 renders the transistor conducting.

When the transistor 42 is changed from a nonconducting condition to a conducting condition, the rate of flow of current through the light emitting diode 14a increases. This results in white light of a high intensity being emitted from the light emitting diode 14a to illuminate objects. At this time, the white light from the light emitting diode 14a has an intensity sufficient to illuminate objects at a distance of more than six feet from the flashlight 10a. There is a continuous flow of current from the light emitting diode through the voltage regulator 40 to the drain of the transistor 42. The current flows from the source of the transistor 42 to ground.

The light emitting diode 14a remains continuously energized to emit white light of a relatively high intensity until the pushbutton 18a is again actuated. Upon depressing and releasing the pushbutton 18a, the flip/flop 46a toggles from the on condition in which it has high output signal to the off condition in which it has a low output signal. When this occurs, the transistor 42 is rendered nonconducting. This results in the light emitting diode 14a again being energized by a relatively small flow of current through the resistor 50 to ground.

In the embodiment of the invention illustrated in FIG. 3, the diode 14a emits white light of a high intensity when the switching transistor 42 is conducting and emits white light of a low intensity when the switching transistor is nonconducting. It is contemplated that the switching circuitry 26a could have many different constructions. For example, switching transistor 42 and the diode 14a can be changed in places or changed in their polarities. If desired, the switching transistor 42 could be switched between the conducting and nonconducting conditions in response to a signal from a source other than the flip/flop 46.

Switching Circuitry—Second Embodiment

Figure 4:
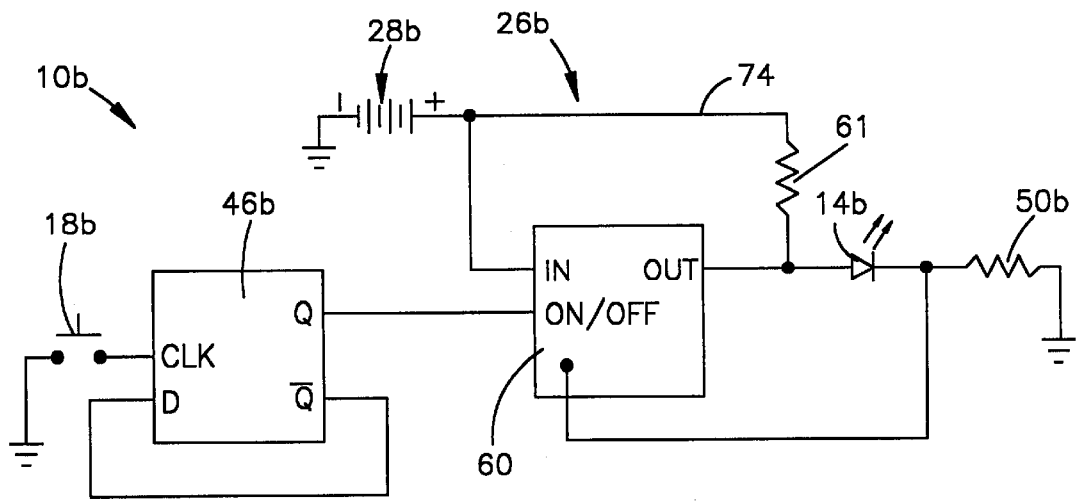
FIG. 4 is a schematic illustration of another embodiment of electrical circuitry which may be used with a light emitting diode in the flashlight of FIG. 1.
Figure 5:
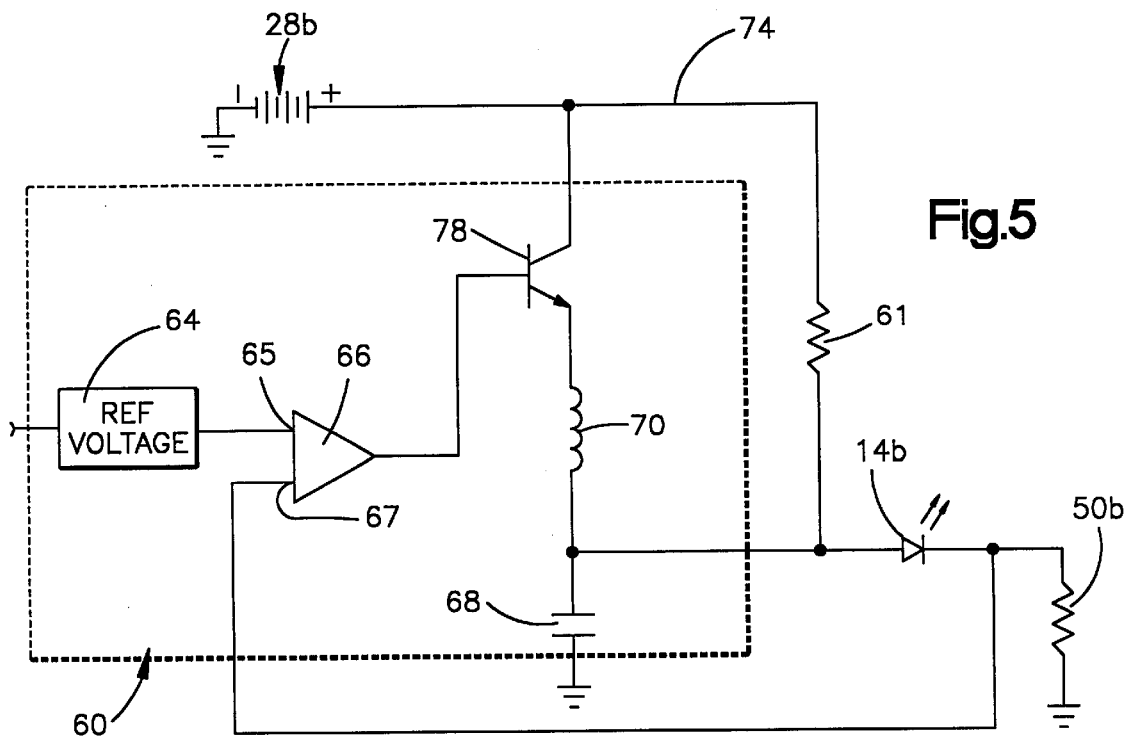
FIG. 5 is a schematic illustration of regular circuitry which is part of the electrical circuitry of FIG. 4.

In the embodiment of the invention illustrated in FIG. 3, there is a continuous flow of a relatively small amount of current from the battery 28a when the light emitting diode is energized to emit white light of a low intensity and a continuous flow of current at a greater rate from the battery when the light emitting diode is energized to emit white light of a high intensity. In the embodiment of the invention illustrated in FIGS. 4 and 5, the flow of current from the battery is varied to maintain a constant rate of flow of current through the light emitting diode as the strength of the battery decreases. Since the embodiment of the invention illustrated in FIGS. 4 and 5 is generally similar to the embodiment of the invention illustrated in FIGS. 1–3, similar numerals will be utilized to designate similar components, the suffix letter "b" being associated with the numerals of FIGS. 4 and 5 to avoid confusion.

A flashlight 10b (FIG. 4) has a battery 28b which functions as a source of power for a light emitting diode 14b. When the light emitting diode 14b is energized by a relatively small flow of current, the diode is effective to produce white light at a relatively low intensity. When the light emitting diode 14b is energized by a larger flow of current, the diode is effective to produce white light of a relatively high intensity. The high intensity white light is capable of illuminating objects at a distance of six feet or more from the flashlight.

The flow of current through the flashlight 10b is controlled by switching circuitry 26b. The switching circuitry 26b includes a manually actuated momentary pushbutton 18b. The switching circuitry 26b also includes a switching regulator 60 and a flip/flop 46b. The regulator 60 is effective to store electrical energy and to discharge the stored electrical energy to maintain the intensity of the white light emitted from the diode 14b constant at either a low intensity or a high intensity as the strength of the battery 28b decreases. This enables the flashlight 10b to provide light of a desired intensity, that is either a low intensity or a high intensity, as the strength of the battery decreases. Of course, this increases the operating life of the battery 28b.

When there is a low output signal from the flip/flop 46b, the flow of current through the switching regulator 60 is interrupted. At this time, there will be a relatively small flow of current from the battery 28b through a resistor 61, the light emitting diode 14b, and resistor 50b to ground. This relatively small flow of current is effective to energize the light emitting diode 14b to provide white light of low intensity. The low intensity white light enables the flashlight 10b to be readily located.

When the flashlight 10b is to be switched from emitting light of low intensity to emitting light of high intensity, the pushbutton 18b is actuated. When the pushbutton 18b is depressed and then released, the condition of the flip/flop 46b changes from a low output signal to high output signal to the regulator 60. In response to this output signal, the regulator 60 enables a relatively high flow of current to be conducted from the battery 26b through the switching regulator to the white light emitting diode 14b. At this time, the light emitting diode 14b is effective to provide white light of high intensity, that is an intensity sufficient to illuminate an object more than six feet from the flashlight 10b.

The construction of the regulator 60 is illustrated schematically in FIG. 5. The regulator 60 includes a reference voltage source 64 which is connected to an input terminal 65 of a comparator 66. The other terminal 67 of the comparator 66 is connected with a capacitor 68 and an inductor 70. Lead 74 connects the switching regulator 60 with the battery 28b.

When the voltage at the inductor 70 and capacitor 68 is less than the reference voltage, the high output signal from the comparator 66 is conducted to a transistor 78 to render the transistor conducting. When this occurs, current from the battery 28b is conducted from the input lead 74 to the transistor 78, inductor 70 and capacitor 68 to ground. This results in the capacitor 68 and coil 70 being charged until the voltage at the terminal 67 of the comparator is more than the reference voltage. When this occurs, the low output signal from the comparator forces the transistor 78 to be rendered nonconducting. At this time, electrical energy is discharged from the inductor 70 and capacitor 68 to the light emitting diode 14b.

When the battery 28b is relatively strong, the length of time required to charge the inductor 70 and capacitor 68 is relatively short. However, as the strength of the battery 28b gradually decreases, the length of time required to charge the inductor 70 and capacitor 68 increases. When the battery 28b is discharged to a level which is just slightly less than the reference voltage 64, the transistor 78 is continuously maintained in a conducting condition so that the light emitting diode 14b is energized by the battery 28b. This enables the battery 28b to be utilized to energize the light emitting diode 14b as the strength of the battery 28b decreases.

Flashlight—Generator

In the embodiments of the invention illustrated in FIGS. 1–5, a battery 28 is utilized as the power source for the flashlight 10. In the embodiment of the invention illustrated in FIG. 6, a coil spring is utilized to store energy to drive a generator which provides power to energize a light emitting diode. Since the embodiment of the invention illustrated in FIG. 6 is generally similar to the embodiment illustrated in FIGS. 1–5, similar numerals have been utilized to designate similar components, the suffix letter "c" being associated with the embodiment of the invention illustrated in FIG. 6 to avoid confusion.

A flashlight 10c includes a housing 12c which encloses a reflector 16c and a light emitting diode 14c. A manually actuatable switch 18c is operable to effect operation of switching circuitry (not shown) having the same construction as the switching circuitry 26a of FIG. 3. When the switching circuitry connected with the switch 18c is in an off condition, the light emitting diode 14c is energized by a relatively small current to emit white light of a low intensity. When the switch 18c is actuated to effect operation of the switching circuitry to an on condition, the light emitting diode 14c is energized by a relatively large flow of current to emit white light of a high intensity.

In accordance with a feature of this embodiment of the invention, power for energizing the light emitting diode 14c is obtained from a generator 88 which is driven by a coil spring 90. A manually actuatable input member 92 is rotatable to effect operation of a gear mechanism 94 to resiliently deflect the coil spring 90. The coil spring 90 powers the generator 88 through a gear mechanism to provide electrical energy for energizing the light emitting diode 14c.

Figure 6:
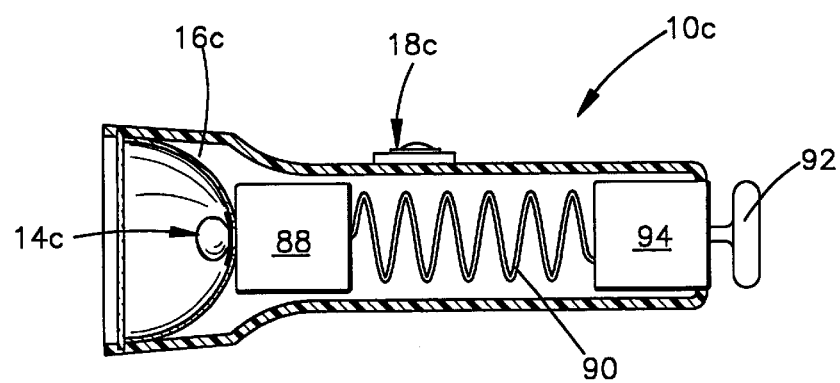
FIG. 6 is a schematic illustration of a flashlight having a light emitting diode which is energized by a spring driven generator.

It should be understood that the relationship between the gear drive 94, coil spring 90 and generator 88 has been indicated schematically in FIG. 6. It is contemplated that the coil spring, gear mechanism 94 and generator 88 may have any one of many known constructions. Specifically, it is. contemplated that the gear mechanism 94, coil spring 90 and generator 88 could be interconnected in the same manner as is disclosed in U.S. Pat. No. 2,105,719. Alternatively, the gear mechanism 94, coil spring 90 and generator 88 could be interconnected in the manner disclosed in U.S. Pat. No. 3,099,402. The disclosures from the aforementioned U.S. Pat. Nos. 2,105,719 and 3,099,402 are incorporated herein in their entirety by this reference thereto. However, it should be understood that the gear mechanism 94, coil spring 90 and generator 88 could have any one of many constructions and it is not intended to limit the present invention to any specific construction of the gear mechanism, coil spring and generator.

Flashlight—Housing

In the embodiment of the invention illustrated in FIGS. 1 and 6, the flashlight 10 has a generally cylindrical housing. In the embodiment of the invention illustrated in FIG. 7, the flashlight has a generally rectangular housing. Since the embodiment of the invention illustrated in FIG. 7 is generally similar to the embodiments of the invention illustrated in FIGS. 1–5, similar numerals will be utilized to designate similar components, the suffix letter "d" being associated being associated with the numerals of FIG. 7 to avoid confusion.

A flashlight 10d (FIG. 7) has a generally rectangular housing 12d. A momentary switch 18d is mounted on a major side wall 100 of the rectangular housing 12d. A lens 20d is disposed in a minor side wall 102 of the housing 12d. A battery and electronic circuitry corresponding to the electronic circuitry of FIGS. 4 and 5, are enclosed within the housing 12d. In the embodiment of the invention illustrated in FIG. 7, the switch assembly 18d may be actuated to switch a light emitting diode (not shown but corresponding to the light emitting diode 14 of FIGS. 1–5), between an off condition, an on condition in which the diode emits low intensity white light, an on condition in which the diode emits high intensity white light, and an on condition in which the diode is intermittently energized to emit a flashing light. The flashing light is obtained by providing a timing circuit in conjunction with the circuitry of FIGS. 3 and 5.

Figure 7:
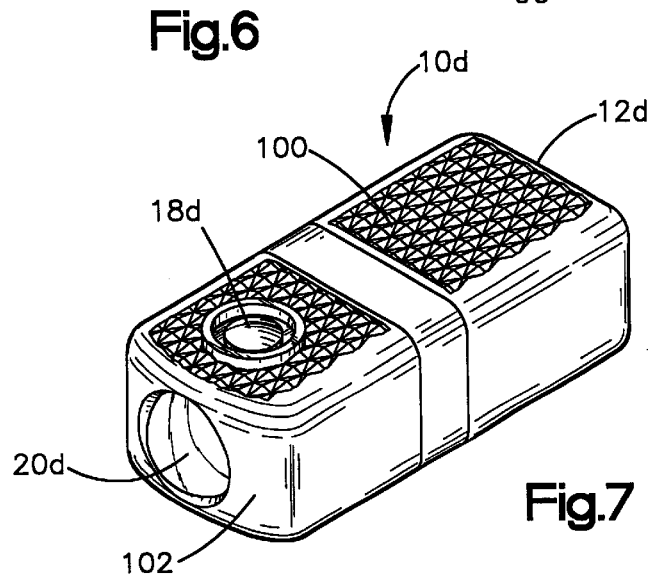
FIG. 7 is a pictorial illustration of a flashlight which may include the electrical circuitry of FIGS. 3, 4 and/or 5.

Although the flashlight 10d has been illustrated in FIG. 7 as having a rectangular housing, it is contemplated that the flashlight could have a housing with any desired construction. It should be understood that the invention in this application is not to be limited to a flashlight having a housing with any particular construction.

CONCLUSION

From the foregoing description, it is apparent that the present invention provides a new and improved flashlight 10, that is, a portable electric light,. The flashlight 10 has a semiconductor diode 14 which is capable of emitting light when energized. Electrical circuitry 26 interconnects the light emitting diode 14 and a source of power which may be either a battery 28 or a generator 88.

The electrical circuitry 26 includes a switch 42 which is operable between a first condition and a second condition. When the switch 42 is in the first condition, the diode 14 is energized to provide light of a low intensity to facilitate locating the flashlight. When the switch 42 is in the second condition, the diode 14 is energized to provide light of a high intensity which may be sufficient to illuminate objects spaced more than six feet from the flashlight. The diode 14 may emit white light when energized.

The electrical circuitry 26 may include a manually movable member 18 and a flip/flop 46. Upon actuation of the flip/flop 46, a transistor or other semiconductor device 42 is switched between conducting and nonconducting states. The light emitting diode 14 is changed between a condition in which it is energized to emit high intensity white light and low intensity white light in response to actuation of the transistor 42 between the conducting and nonconducting states.

A regulator 60 is advantageously connected with the diode 14 and the source of power 28 to maintain the intensity of the white light emitted from the diode 14 substantially constant. When the diode 14 is energized to provide high intensity white light, the regulator 60 is effective to maintain the intensity of the white light constant even though the strength of the source of power 28 or 88 connected with the diode 14 decreases. This enables white light of a uniform intensity to be obtained from the light emitting diode 14 even though a power source 28 or 88 which gradually discharges with the passage of time is used to energize the light emitting diode.

Having described the invention, the following is claimed:

1. A flashlight comprising a source of power, a diode capable of emitting white light when energized, and electrical circuitry connected with said source of power and said diode, said electrical circuitry including a field effect transistor which is operable between a plurality of conditions, said field effect transistor being operable between a first condition in which said electrical circuitry is effective to energize said diode with a first electrical potential to cause said diode to emit white light of a first intensity, a second condition in which said electrical circuitry is effective to energize said diode with a second electrical potential which is less than said first electrical potential to cause said diode to emit white light of a second intensity which is less than said first intensity, and a third condition in which said electrical circuitry is ineffective to energize said diode and said diode is ineffective to emit light, said diode being energized to emit white light of an intensity sufficient to illuminate objects spaced more than six feet from said flashlight when said field effect transistor is in the first condition, said diode being energized to emit white light of an intensity which is insufficient to illuminate objects spaced more than six feet from said flashlight when said field effect transistor is in the second condition.

2. A flashlight set forth in claim 1 further including regulator means for maintaining the intensity of the white light emitted from said diode substantially constant when said field effect transistor is in the first condition with a decrease in the strength of said source of power.

* * * * *